US008087895B2

(12) United States Patent
Pedersen (10) Patent No.: US 8,087,895 B2
(45) Date of Patent: Jan. 3, 2012

(54) HANDLING SYSTEM FOR A WIND TURBINE NACELLE, METHODS FOR TRANSPORT AND VERTICAL DISPLACEMENT OF A WIND TURBINE NACELLE AND A USE OF A HANDLING SYSTEM

(75) Inventor: Gunnar Kamp Storgaard Pedersen, Skjern (DK)

(73) Assignee: Vestas Wind Systems A/S, Aarhus N (DK)

( * ) Notice: Subject to any disclaimer, the term of this patent is extended or adjusted under 35 U.S.C. 154(b) by 536 days.

(21) Appl. No.: 12/306,579

(22) PCT Filed: Jun. 29, 2007

(86) PCT No.: PCT/DK2007/000323
§ 371 (c)(1),
(2), (4) Date: Dec. 24, 2008

(87) PCT Pub. No.: WO2008/000268
PCT Pub. Date: Jan. 3, 2008

(65) Prior Publication Data
US 2009/0202350 A1    Aug. 13, 2009

(30) Foreign Application Priority Data
Jun. 29, 2006 (DK) .................. 200600874

(51) Int. Cl.
*F03D 11/04* (2006.01)
(52) U.S. Cl. ............... 416/132 B; 416/244 R; 415/232; 290/55
(58) Field of Classification Search ............ 415/232; 416/63, 132 R, 132 B, 133
See application file for complete search history.

(56) References Cited

U.S. PATENT DOCUMENTS
3,289,868 A    12/1966    Miller et al.

FOREIGN PATENT DOCUMENTS
| RU | 2 075 643 | 3/1997 |
| WO | WO03/071130 | 8/2003 |
| WO | WO03/100248 | 12/2003 |
| WO | WO2004/101313 | 11/2004 |

*Primary Examiner* — Stephen W Smoot
(74) *Attorney, Agent, or Firm* — Wood, Herron & Evans, L.L.P.

(57) ABSTRACT

A handling system for a wind turbine nacelle in connection with self-loading or self-unloading of the nacelle to or from a vehicle. Two or more lifting apparatus are provided for displacing the nacelle substantially vertically during the self-loading or self-unloading of the nacelle. The lifting apparatus has displacing apparatus for displacing the lifting apparatus or a part of the lifting apparatus. A method for transport of a wind turbine nacelle, a method for vertical displacement of a wind turbine nacelle, and use of a handling system, are also disclosed.

17 Claims, 9 Drawing Sheets

HANDLING SYSTEM FOR A WIND TURBINE NACELLE, METHODS FOR TRANSPORT AND VERTICAL DISPLACEMENT OF A WIND TURBINE NACELLE AND A USE OF A HANDLING SYSTEM

PRIORITY CLAIM

This is a U.S. national stage of application No. PCT/DK2007/000323, filed on Jun. 29, 2007, Priority is claimed on the following application(s): Country: Denmark, Application No.: PA200600874, Filed: Jun. 29, 2006, the content of which is incorporated here by reference.

BACKGROUND OF THE INVENTION

The invention relates to a handling system for a wind turbine nacelle in connection with self-loading or self-unloading of the nacelle to or from a vehicle, a method for transport of a wind turbine nacelle, a method for vertical displacement of a wind turbine nacelle and use of a handling system.

DESCRIPTION OF THE RELATED ART

A wind turbine known in the art comprises a tapered wind turbine tower and a wind turbine nacelle positioned on top of the tower. A wind turbine rotor with a number of wind turbine blades is connected to the nacelle through a low speed shaft, which extends out of the nacelle front.

As large modern wind turbines gets bigger and bigger the transportation and general handling of the different wind turbine parts becomes an increasing problem. Particularly the nacelle, which most often is big as a house and can weigh up to 100 metric ton, can be difficult to handle and transport. The components of the nacelle could of course be transported separately and then assembled at the erection site but most of the nacelle equipment is highly complicated and the interaction between the components is complex, making it highly inefficient to assemble it at the erection site. It is therefore advantageous that particularly the nacelle is fitted under controlled circumstances and that this assembly is done by experts to reduce the risk of very costly breakdowns.

A number of different means and methods have therefore been suggested over the time on how to transport and handle wind turbine nacelles—particularly from the manufacturing plant to the erection site. One example is disclosed in international patent application WO 03/071130 A1 where a nacelle with the rotor hub mounted is suspended between truck and a trailer during the transport. The truck and trailer can load and unload the nacelle directly from and to the ground, by raising and lowering the wheels of the trailer and by means of special lifting equipment on the truck.

It is of course advantageous that the truck and trailer is capable of loading and unloading the nacelle without the use of additional lifting equipment, but this method has its limitations in the fact, that the nacelle has to be self-sustaining in its entire length, the hub has to be mounted on the nacelle hereby adding additional length to an already long nacelle, the hub has to be able to carry substantially the entire weight of the nacelle, the truck has to be special fitted with the lifting means and in that the vehicle and load becomes so long that it might be virtually impossible to travel on most roads.

The object of the invention is therefore to provide for a technique for handling wind turbine nacelles without the above mentioned disadvantages.

Especially it is an object of the invention to provide for a simple and advantageous handling technique.

SUMMARY OF THE INVENTION

The invention provides for a handling system for a wind turbine nacelle in connection with self-loading or self-unloading of the nacelle to or from a vehicle. The system comprises two or more lifting means for displacing the nacelle substantially vertically during the self-loading or self-unloading of the nacelle. The lifting means further comprises displacing means for displacing the lifting means or a part of the lifting means.

E.g. when a nacelle has to be transported from a manufacturing plant located in Europe to an erection site in Australia, the nacelle is transported to a harbour where it is loaded onto a ship, which sails it to Australia. In most areas of Australia there are no height limitations of vehicles travelling the roads, making it possible to transport the nacelle from the harbour to the erection site on top of the platform body of a standard heavy duty trailer pulled by a large standard truck. But since the nacelle weighs as much as 100,000 kilograms it takes a very large crane to handle the nacelle at the harbour and to load and unload it from the trailer. Having to transport such a crane to the erection site to unload the nacelle would be very expensive and disadvantageous. A truck and trailer comprising special lifting equipment could of course be used but since this vehicle is special made to this specific task, it would have to follow the nacelle during the entire trip, which would be both unpractical and expensive.

A handling system which enables that the nacelle can load and unload itself to or from a vehicle is therefore advantageous, in that no further lifting equipment would be needed when loading and unloading the nacelle to and from a transportation vehicle.

Enabling that the lifting means—or at least the part of the lifting means that performs the vertical lift—can be displaced is advantageous, in that it hereby is possible to place the lifting means in a more advantageous position e.g. during mounting of the lifting means or during transport of the nacelle with lifting means mounted.

Furthermore, lifting means for lifting a nacelle for a large modern wind turbine has to be very big to cope with the load and to be able to produce sufficient lifting force. It is therefore advantageous that the lifting means can be displaced e.g. between positions which are optimal for loading and positions which are advantageous during transport of the nacelle and handling system, so that the big and heavy lifting means do not have to be dismounted during transport and then remounted at the destination. In an aspect of the invention, at least one first lifting mean of said two or more lifting means comprises means for being engaged with said nacelle at or near the outer periphery of said nacelle.

It is advantageous that the nacelle is lifted at or near the periphery in that this provides for a more stable lifting procedure.

It should be emphasized that by the term "outer periphery of the nacelle" is to be understood the outer edge of the nacelle in the horizontal plane when the nacelle is positioned upright in its normal operation position i.e. the outer limits of the nacelle as seen from the top or the bottom of the nacelle.

In an aspect of the invention, at least one second lifting mean of said two or more lifting means comprises means for acting on said nacelle at or near a longitudinal centre axis of said nacelle.

It is advantageous that the nacelle is lifted at or near the longitudinal centre axis of the nacelle in that the nacelle is then lifted closer to the nacelles centre of gravity—at least in the transverse direction of the nacelle—which provides for a more simple lifting procedure or at least a more simple design of the lifting means in that the load are more specifically distributed.

In an aspect of the invention, said at least one second lifting mean being engaged with a base device connected to said nacelle.

The base device is designed to support the nacelle during transport, storage and other and is therefore designed to maintain the nacelle upright at all times. Enabling that the second lifting means acts on the nacelle through the base device is load and stress distribution-wise more advantageous, in that the lifting points or areas are moved near the longitudinal centre axis at the underside of the nacelle which is a more optimal position regarding stress distribution in the load carrying structure of the nacelle—especially compared to lifting the nacelle in the ends. This handling system design would enable that a nacelle could be lifted even though it was not self-supporting in its entire length.

In an aspect of the invention, said base device is connected to an annular member at the bottom of said nacelle.

Hereby is ensured an even and symmetrical load distribution to the nacelle.

In an aspect of the invention, said base device is bolted to an annular member at the bottom of said nacelle.

Bolts are strong and efficient means for connecting devices and it is therefore advantageous to bolt the base device to the annular member.

In an aspect of the invention, said at least one second lifting mean engages with said base device at a front end of said base device.

Joining the second lifting means and the base device at the front end of the base device is advantageous in that it hereby is easier to attach and dismount the lifting means.

In an aspect of the invention, said base device comprises means for maintaining said nacelle in a substantially fixed and upright position when connected to said nacelle.

Providing the nacelle with a base device that e.g. enables the nacelle to be stored or transported without it falling over is advantageous in that it is a simple, inexpensive and efficient way of increasing manageability of the nacelle.

In an aspect of the invention, said annular member is a part of a yaw arrangement for said nacelle.

Practically all modern wind turbines are provided with some sort of yaw arrangement between the tower and the nacelle to ensure that the rotor at all times is place in a desired position in relation to the direction of the wind. The yaw arrangement on the nacelle is designed to transfer the entire load of the nacelle, the rotor, the wind and other to the tower and it is therefore advantageous to lift the nacelle in or through this arrangement in that this arrangement accordingly is designed to transfer great loads.

In an aspect of the invention, said at least one second lifting mean comprises means for acting on an underside of said nacelle.

Most mechanical devices are designed to be at strong at the bottom towards vertical loads to be able to handle the force of gravity acting on the device. Furthermore, nacelles are designed to transfer a great load to an underlying tower and it is therefore advantageous to make the second lifting means act on the underside of the nacelle.

Even further, when acting on the underside of the nacelle the load is transferred closer to the nacelles centre of gravity which means that the lifting means and the lifting points on the nacelle do not see as much moment and hereby can be designed simpler.

In an aspect of the invention, said displacing means enables displacement at least in a substantially horizontal plane.

If just the horizontal displacing means are made with a sufficiently low friction it is possible for a single operator to move even a very big load back and forth between different position without additional equipment as long as the operator does not have to overcome the influence of the forces of gravity in other way that the friction in the displacement means. It is therefore advantageous that the displacing means enables displacement in the horizontal plane.

In an aspect of the invention, said displacing means comprises means for displacing a part of said lifting means in relation to one or more engaging members of said lifting means, where said engaging members comprises means for being directly or indirectly engaged with said nacelle.

This is advantageous in that it enables that the lifting means can be displaced even though the lifting means are connected directly or indirectly to the nacelle.

In an aspect of the invention, said displacing means comprises one or more hinges enabling said displacement.

Hinges are simple and inexpensive means for enabling displacement.

In an aspect of the invention, said at least one first lifting mean comprises means for lifting by applying linear force to a load carrying structure of the nacelle.

The load carrying structure is designed to handle great loads and it is therefore advantageous to lift the nacelle by applying force to the load carrying structure of the nacelle.

In an aspect of the invention, said at least one first lifting mean being engaged with lifting areas of a load carrying structure of said nacelle, said lifting areas being a part of said load carrying structure or being rigidly connected to said load carrying structure.

Integrating the lifting areas in the load carrying structure or rigidly connecting the lifting areas to the load carrying structure is advantageous in that it hereby is simple to ensure that the load is distributed efficiently.

In an aspect of the invention, said two or more lifting means comprise means for vertical displacement of said lifting areas.

Hereby is achieved an advantageous embodiment of the invention.

In an aspect of the invention, said lifting areas are integrated in a bottom structure of said load carrying structure such as in a nacelle bed frame or in the bottom of a nacelle lattice work.

Most nacelles are already designed with at very strong bottom structure of the load carrying structure and it is therefore advantageous to use lifting areas on this bottom structure as points of attack when lifting or lowering the nacelle. Substantially no or very little redesigning of the load carrying structure would be needed to adapt a nacelle to the described handling system.

In an aspect of the invention, said lifting areas are positioned substantially symmetrically in relation to said longitudinal centre axis of said nacelle.

The load from the components inside the nacelle is substantially symmetrically distributed in the nacelle and the load carrying structures strength and ability to carry this load is therefore also substantially symmetrically distributed and it is therefore also advantageous to position the lifting areas substantially symmetrically on the load carrying structure.

In an aspect of the invention, said lifting areas are established in the longitudinal sides of said nacelle.

By establishing the lifting areas in the longitudinal sides of the nacelle it is possible to bring the lifting means so far out to the sides that it is possible to position a trailer under the nacelle while the lifting means lifts the nacelle.

Furthermore, the nacelle is much longer than it is wide and a lifted nacelle is therefore more stable if it is lifted at the sides than at the ends.

Even further this position provides free access to the ends of the nacelle e.g. for connecting the lifted nacelle to a truck and trailer.

It should be emphasised that by the term "longitudinal sides", is to be understood the substantially vertical sides facing sideward during normal operation of the nacelle when mounted on an erected wind turbine.

In an aspect of the invention, said lifting areas are established in a back side of said nacelle.

Nacelles of large modern wind turbines are very large and especially the width of the nacelle can be a problem during road transport of the nacelle. Placing the lifting areas on the back side of the nacelle is therefore advantageous in that it enables that the nacelle can be provided with lifting means without the lifting means increasing the width of the nacelle with handling system.

Furthermore, the lifting areas would most likely form indentations, bulges or other in the surface of the nacelle and by placing them at the back side of the nacelle the risk of the indentations, bulges or other generating noise in the wind is severely reduced.

It should be emphasised that by the term "back side", is to be understood the substantially vertical side facing away from the incoming wind during normal operation of the nacelle when mounted on an erected wind turbine.

In an aspect of the invention, said lifting areas are established in relation to the weight distribution of said nacelle providing substantially uniform load on each of said at least one first lifting mean when self-loading or self-unloading.

If the load on each lifting mean is substantially the same when lifting the nacelle, the lifting means can be made identically. Especially regarding manufacturing costs, spare parts and other it is advantageous that the lifting means are substantially uniform.

In an aspect of the invention, said handling system comprise at least two individually adjustable lifting means.

Lifting means for lifting a nacelle weighing up to 100 metric ton can be very expensive to manufacture and by only using two it is possible to reduce the set-up costs.

In an aspect of the invention, said handling system comprise at least three individually adjustable lifting means.

It is hard to maintain the balance of a heavy object standing on two "legs". Making the handling system comprise at least three individual adjustable lifting means engaged with the nacelle is therefore advantageous, in that it provides for a steady and stable system and the risk of the nacelle wobbling in reduced when supported by three "legs".

In an aspect of the invention, said at least one second lifting mean of said two or more lifting means acts on an annular member of said nacelle.

The annular member at the bottom of the nacelle intersects the nacelles longitudinal centre axis two places and by acting on the annular member it is thereby possible to act on the nacelle at the nacelles longitudinal centre axis.

In an aspect of the invention, at least one of said two or more lifting means comprises means for being substantially rigidly connected to at least one further of said two or more lifting means.

A separate lifting mean is very vulnerable to torsion and forces in other directions than vertical in general but by rigidly connecting at least two of these lifting means, the handling system in a simple and inexpensive way become much more stable.

In an aspect of the invention, at least one of said two or more lifting means comprises means for substantially rigidly connecting an engaging member of said at least one lifting means to an engaging member of at least one further lifting mean.

By rigidly connecting the engaging members of the lifting means it is ensured that the load from the individual lifting means are distributed over a larger area of the nacelle, and since it is most likely that the lifting points on the nacelle are fixed in relation to one another at all times it is advantageous to rigidly connect the engaging members of two or more lifting means.

In an aspect of the invention, said at least two lifting means and/or said at least two engaging member of said two or more lifting means are connected rigidly by means of a transverse boom.

Hereby is achieved an advantageous embodiment of the invention.

In an aspect of the invention, said transverse boom is and/or comprise said one or more engaging members for connecting said lifting means directly or indirectly to said nacelle.

To be able to cope with the forces between the lifting means the transverse boom has to be made relatively strong and it is therefore advantageous to utilize this strength to transfer the force from the lifting means to the nacelle.

In an aspect of the invention, said two or more lifting means comprise one or more hydraulic cylinders each.

A hydraulic cylinder is capable of lifting a relatively great load compared to its size, which is advantageous, in that these hydraulic cylinders most often would have to travel with the nacelle, hereby reducing the space needed and the weight of the transported load.

In an aspect of the invention, said load carrying structure are configured for carrying the entire weight of said nacelle and nacelle components mounted in said nacelle such as generator, gear, bearings, control cupboards and/or inverters.

Hereby is achieved an advantageous embodiment of the invention.

In an aspect of the invention, said two or more lifting means are detachable.

Making the lifting means detachable is advantageous in that it enables that the same lifting means can be used to lift different nacelles and in that the nacelles weight is reduced when mounted on the wind turbine tower.

The invention further provides for a method for transport of a wind turbine nacelle. The method comprises the steps of
  providing the nacelle with a handling system,
  lifting the nacelle by means of lifting means of said handling system,
  position a vehicle for transporting the nacelle beneath the nacelle,
  retracting the lifting means to place the nacelle on the vehicle, and
  displacing one or more of the lifting means at least in a horizontal plane.

This method is advantageous, in that it hereby is possible to use the handling system to self-load and self-unload the nacelle without the handling system having to be dismounted between the two operations.

This is further advantageous in that a handling system capable of lifting a nacelle for a large modern wind turbine is very heavy and therefore difficult to handle and because the handling system most likely would have to be transported along with the nacelle anyway.

In an aspect of the invention, said displacing of said lifting means at least in a horizontal plane reduces the overall width of said handling system.

In most countries there are limits to the width of loads travelling on the roads and since nacelles already are very wide it is advantageous that the overall width of the handling system can be reduced during transport. This will also enable the more nacelles (with handling system mounted) can be loaded in the same space on ships or in storage hereby reducing transportation and storage costs.

In an aspect of the invention, said vehicle is a flatbed truck.

Flatbed trucks are advantageous for transporting nacelle.

Even further the invention provides for a method for vertical displacement of a wind turbine nacelle. The method comprises the steps of
- engaging one or more first lifting means with the nacelle at or near the outer periphery of the nacelle,
- enabling one or more second lifting means to act on or near a longitudinal centre axis of the nacelle, and
- vertically displacing the nacelle by applying linear force to said nacelle by means of said first and second lifting means.

This method is advantageous, in that it hereby is possible to lift the nacelle without the need of expensive cranes or special made and expensive truck lifting equipment and without stressing the load carrying structure by applying loads in undesired directions through the structure.

In an aspect of the invention, said lifting means are hydraulic cylinders vertically displacing said nacelle substantially proportional with the extension or extraction of a piston of said hydraulic cylinders.

Making the nacelle travel the same length as the piston is extended from the cylinder is advantageous, in that this provides for a more efficient and direct way of lifting the nacelle, and in that this method ensures that the nacelle is not stressed by torsion or forces in undesired directions.

In an aspect of the invention, said one or more second lifting means act on an underside of said nacelle.

In an aspect of the invention, said one or more second lifting means act on at least a part of a yaw arrangement of said nacelle.

In an aspect of the invention, said one or more first lifting means engages with lifting areas integrated in or directly connected to a load carrying structure of said nacelle.

The invention also provides for use of a handling system as described above in relation with a method as described above wherein the nacelle is a nacelle for a Megawatt wind turbine.

Small nacelle can be handled by means of ordinary cranes but a nacelle for a Megawatt wind turbine is so heavy that it is very difficult to get hold of a crane with sufficient capacity and in these cases it is therefore particularly advantageous to use a handling system according to the invention.

BRIEF DESCRIPTION OF THE DRAWINGS

The invention will be described in the following with reference to the figures in which.

DETAILED DESCRIPTION OF THE PRESENTLY PREFERRED EMBODIMENTS

Figure 1:
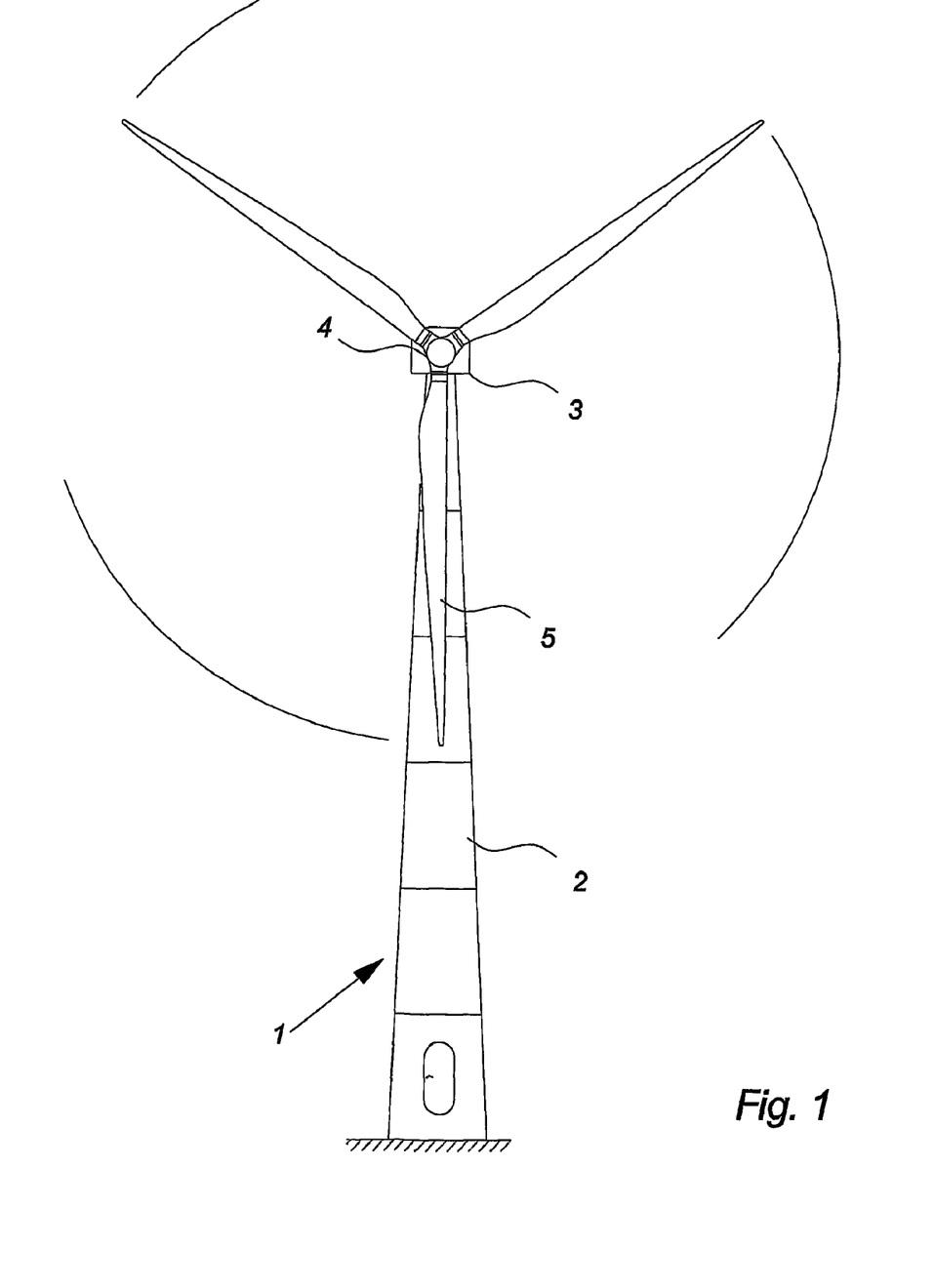
FIG. 1 illustrates a wind turbine according to one embodiment, as seen from the front.

FIG. 1 illustrates a wind turbine 1 according to one embodiment of the invention, comprising a tower 2 placed on a foundation and a wind turbine nacelle 3 positioned on top of the tower 2. The wind turbine rotor 4, comprising three wind turbine blades 5, is connected to the nacelle 3 through the low speed shaft which extends out of the nacelle 3 front.

Figure 2:
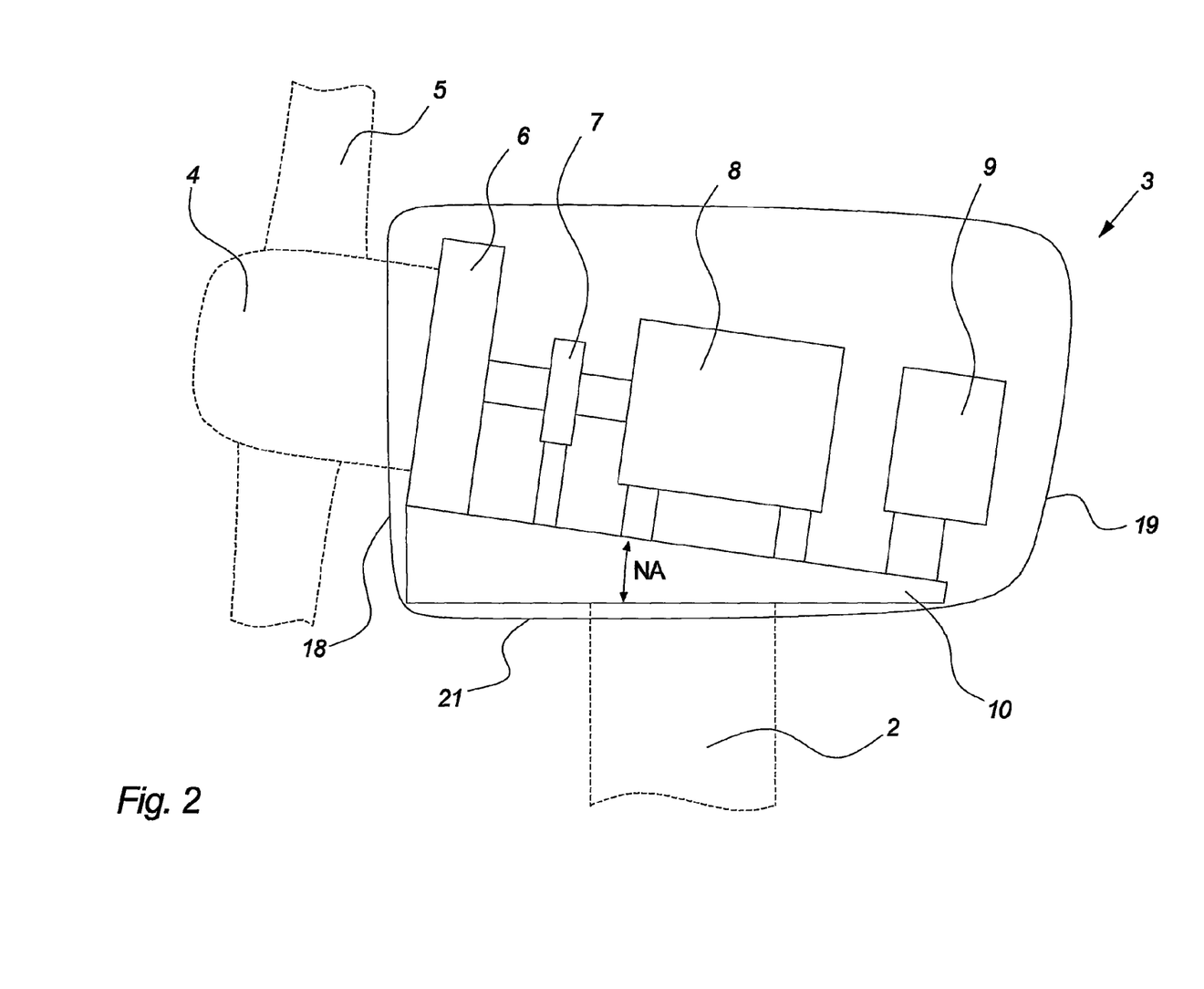
FIG. 2 illustrates a simplified cross section of a nacelle, as seen from the side.

FIG. 2 illustrates a simplified cross section of a nacelle 3, as seen from the side.

Nacelles 3 exists in a multitude of variations and configurations but in most cases the drive train in the nacelle 3 almost always comprise one or more of the following components: a gear 6, a coupling (not shown), some sort of breaking system 7 and a generator 8. A nacelle 3 of a modern wind turbine 1 can also include a converter 9, an inverter (not shown) and additional peripheral equipment such as further power handling equipment, control cupboards, hydraulic systems, cooling systems and more.

The weight of the entire nacelle 3 including the nacelle components 6, 7, 8, 9 is carried by a load carrying structure 10. The components 6, 7, 8, 9 are usually placed on and/or connected to this common load carrying structure 10. In this simplified embodiment the load carrying structure 10 only extends along the bottom of the nacelle 3 e.g. in form of a bed frame to which some or all the components 6, 7, 8, 9 are connected. In another embodiment the load carrying structure 10 could comprise a gear bell transferring the load of the rotor 4 to the tower 2 and/or the load carrying structure 10 could comprise several interconnected parts such as latticework 13.

In this embodiment of the invention the drive train is established in a normal operation angle NA of 8° in relation to a plane perpendicular to the tower 2, a centre axis through the tower 2 and a horizontal plane. The drive trains is for among other reasons angled to enable that the rotor 4 can be angled correspondingly e.g. to ensure that the blades 5 do not hit the tower 2, to compensate for the differences in wind speed at the top and bottom of the rotor 4 and other.

Figure 3:
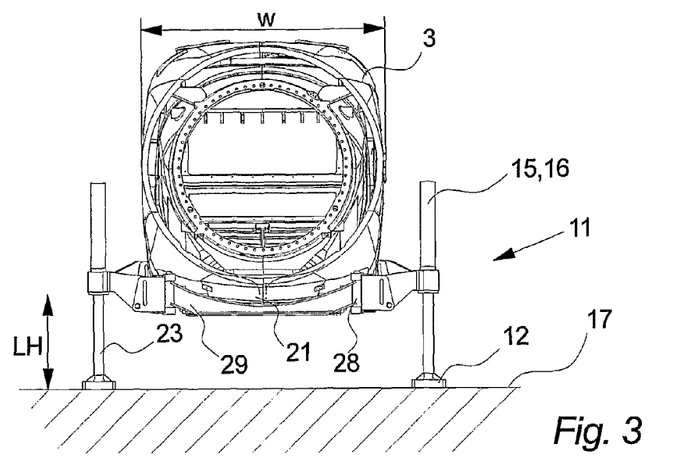
FIG. 3 illustrates a nacelle comprising an embodiment of a handling system, as seen from the front.

FIG. 3 illustrates a nacelle 3 comprising an embodiment of a handling system 11, as seen from the front.

In this embodiment of the invention the handling system 11 comprise lifting means 15, 16 positioned outside the width W of the nacelle 3. Support members 12 of the lifting means 15, 16 are placed on the underlying ground 17 and via the extended lifting means 15, 16 the nacelle 3 is lifted of the ground 17 to a lifting height LH which would enable that a transport vehicle can be placed beneath the nacelle 3.

Figure 4:
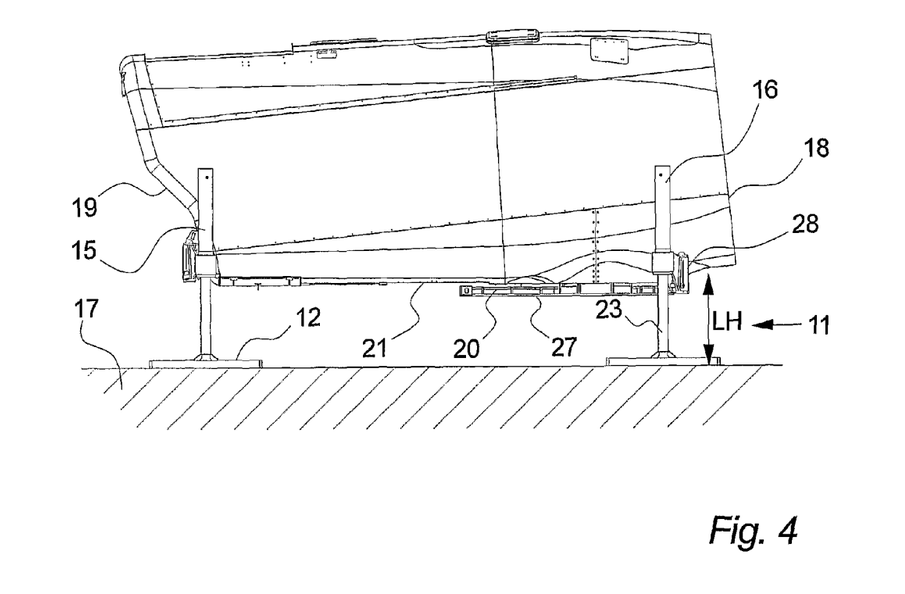
FIG. 4 illustrates a nacelle comprising an embodiment of a handling system, as seen from the side.

FIG. 4 illustrates a nacelle 3 comprising an embodiment of a handling system 11, as seen from the side.

In this embodiment of the invention the lifting means 15, 16 are formed as hydraulic cylinders. The cylinder piston 23 is e.g. through a swivel joint provided with a support member 12 in the form of a plate, knob, shoe or the like at the end pressing against the ground 17 to distribute the load over a larger area.

In this embodiment of the invention the nacelle 3 is provided with two first lifting means 15 at the back side 19 of the nacelle 3 and two second lifting means 16 at the front side 18 of the nacelle 2 but in another embodiment the handling system 11 could comprise another number of first lifting means 15 and second lifting means 16, such as one, three, six or other e.g. in the form of two or three first lifting means 15 at the back side 19 of the nacelle 3 and then only one second lifting means 16 at the front side 18 of the nacelle 3, vice versa or other.

Figure 5:
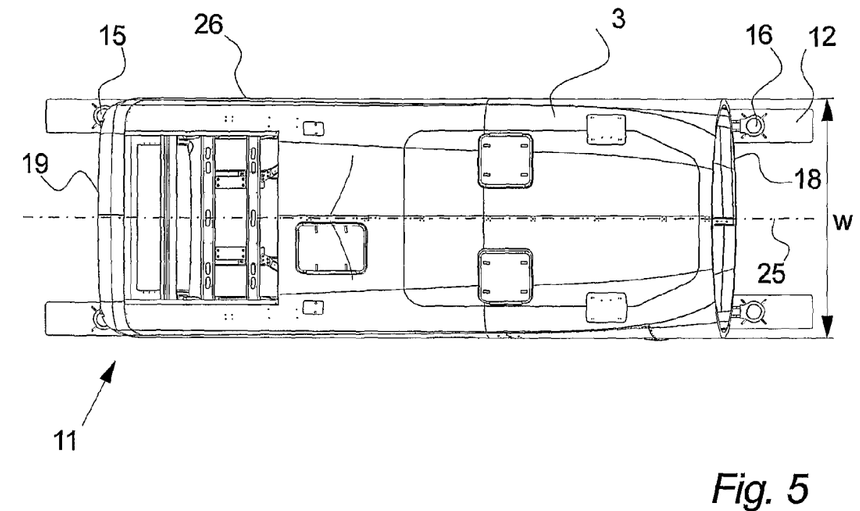
FIG. 5 illustrates a nacelle comprising lifting means in transport position, as seen from the top.

FIG. 5 illustrates a nacelle 3 comprising lifting means 15, 16 in transport position, as seen from the top.

In this embodiment the lifting means 15, 16 are placed in a transport position where the lifting means 15, 16 are moved into a position where they are within the width W of the nacelle 3, whereby the width of the transported load (nacelle 3 and handling system 11) is limited to the width W of the nacelle 3. In another embodiment the lifting means 15, 16 could extend beyond the width W of the nacelle 3 also during transport, as long as the width of the handling system 11 remains within the allowable width of a load during transportation or other.

In this embodiment the lifting means 15, 16 ads to the total length of the load in that the lifting means 15, 16 extends a little out in front and behind the longitudinal length of the of the nacelle 3, but in another embodiment the lifting means 15, 16 could be positioned entirely within the outer periphery of the nacelle 3.

In this embodiment the lifting means 15, 16 are placed symmetrically around the longitudinal centre axis 25 of the nacelle 3 distributing the weight of the nacelle 3 more or less evenly between the lifting means 15, 16. In another embodiment the lifting means 15, 16 could also be placed differently such as at the underside 21 of the nacelle 3, closer to the middle of the nacelle 3 in the longitudinal direction of the nacelle 3, they could be placed differently on either longitudinal side of the nacelle 3 or otherwise e.g. depending on the weight distribution of the nacelle 3 or where it is practical to engage or act on the nacelle 3.

Figure 6:
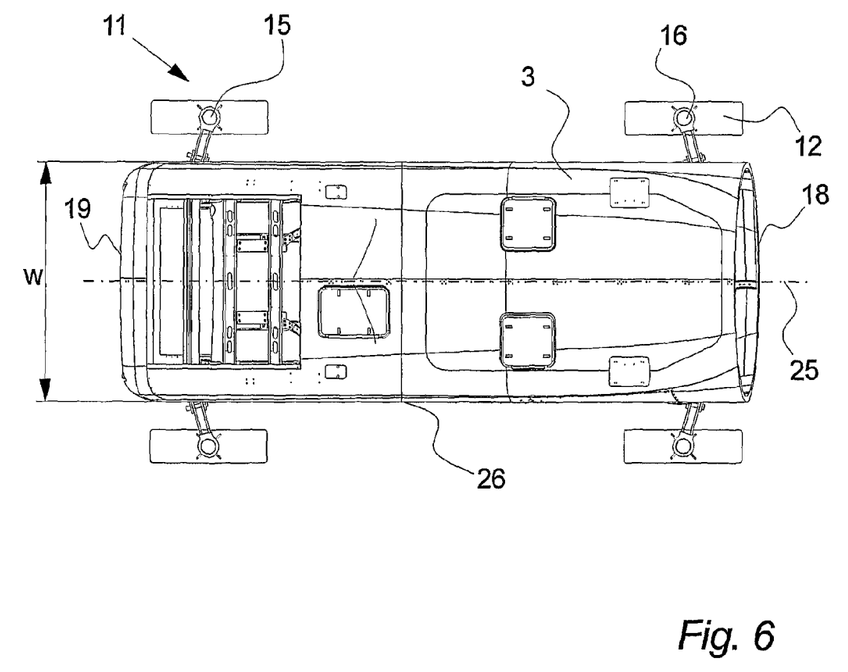
FIG. 6 illustrates a nacelle comprising lifting means in loading position, as seen from the top.

FIG. 6 illustrates a nacelle 3 comprising lifting means 15, 16 in loading position, as seen from the top.

In this embodiment of the invention the lifting means 15, 16 are placed in a loading position to self-load or self-unload the nacelle 3. By moving the lifting means 15, 16 outside the width W of the nacelle 3 the lifting means 15, 16 is also moved outside the width of the transport vehicle on which the nacelle 3 is placed. In this position the lifting means 15, 16 therefore have free passage to the ground 17 no matter is extended down vertically, in an angle to the underlying ground 17 or by rotating horizontally positioned legs to make the vertically positioned and thereby able to lift or lower the nacelle 3.

In this embodiment the lifting means 15, 16 are moved back and forth between the different positions by hand but in another embodiment the lifting means could be displaced by means of relatively small hydraulic cylinders, where the oil pressure could be delivered from the oil pump also delivering pressure for vertical displacement of the entire nacelle 3, which e.g. could be a separate oil pump 24 or an oil pump of the nacelle 3, they could be displaced by means of pneumatic cylinders, where the air pressure could be delivered by the pneumatic system of a transport vehicle or they could be displaced by means of motor driven or manually operated actuators or gearings.

Figure 7:
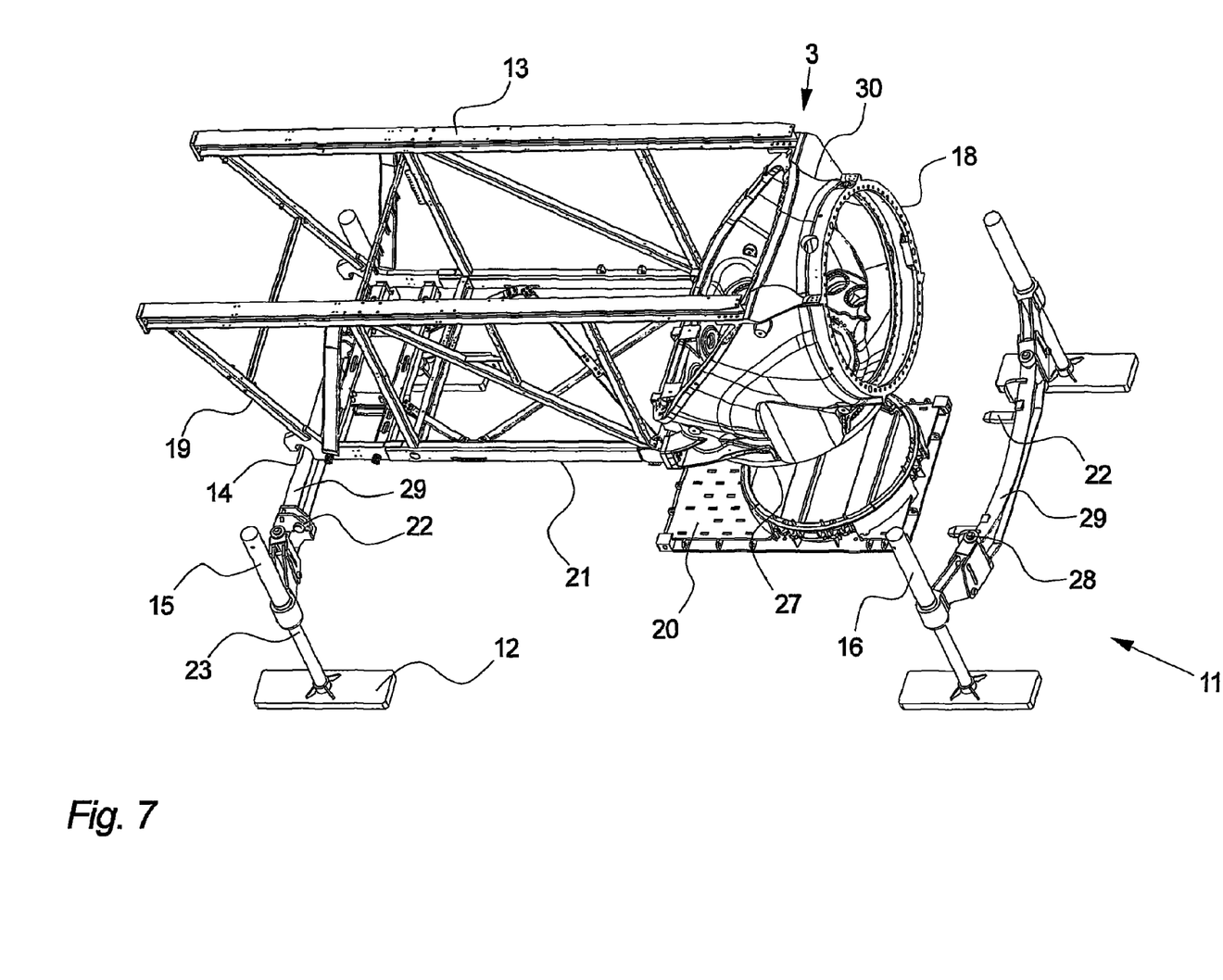
FIG. 7 illustrates the load carrying structure of a nacelle and a handling system, as seen in perspective.

FIG. 7 illustrates the load carrying structure 10 of a nacelle 3 and a handling system 11, as seen in a partially exploded view in perspective.

To get a better idea of how the lifting means 15, 16 can interact with the nacelle 3 the nacelle 3 is in this figure illustrated as only the load carrying structure 10 i.e. the nacelle 3 is shown without the nacelle cover and without the nacelle components usually placed inside the nacelle 3 such as gearbox 6, brake system 7, generator 8, inverter 9 etc.

In this embodiment of the invention the load carrying structure 10 comprise a bottom structure at or very close to the underside 21 of the nacelle 3 which would face the ground 17 during normal handling, transport and operation of the nacelle 3. The bottom structure substantially extends in the entire length and width W of the nacelle 3 and it could e.g. be or include a bed frame. In this embodiment the bottom structure is formed by a relatively simple latticework 13 but in another embodiment the bottom structure could be made by a number of plates and beams welded together to form a strong an rigid surface of the nacelle 3 on which the different nacelle components 6, 7, 8, 9 or at least a majority of the nacelle components 6, 7, 8, 9 (e.g. the majority in weight) can be attached typically by means of bolts.

In this embodiment of the invention the load carrying structure 10 further comprise a latticework 13 substantially extending in the entire length and height on both sides 18, 19 of the nacelle 3. The latticework 13 comprises a number of typically steel beams bolted or welded together. At the underside 21 of the nacelle 3 the latticework 13 are rigidly connected to the bottom structure and at the top the latticework 13 could be connected by traverse supporting beams.

The upper beams of the latticework 13 could e.g. be used as rails or rail support for an overhead traveling crane (not shown) for use when installing, repairing or replacing the drive train components 6, 7, 8 or other.

In another embodiment of the invention the bottom structure could constitute the entire load carrying structure 10.

In this embodiment the load carrying structure 10 comprise a so called gear bell 30 designed to transfer the load of and from the rotor 4 to the tower 2 through the yaw arrangement placed at the annular member 27 at the underside 21 of the nacelle 3. In this embodiment the latticework 13 is rigidly connected to the gear bell 30.

In this embodiment of the invention the load carrying structure 10 further comprise two lifting areas 14 in form of two hook-like corner reinforcements integrated in the bottom structure. In another embodiment the lifting areas 14 could be formed as separate devices connected to the nacelle or it could simply be the load carrying structure 10.

In this embodiment the two first lifting means 15 at the back 19 of the nacelle 3 and the two second lifting means 16 at the front 18 of the nacelle 3 are connected by transverse booms 29 and at each end of these booms 29 the lifting means 15, 16 are provided with displacing means 28 in the form of hinges enabling than the lifting means 15, 16 can be moved back and forth at least between the present loading position and a transport position.

In this embodiment the first lifting means 15 are provided with an engaging member 22 in form of a transverse pin rigidly connected to the transverse boom 29. The engaging member 22 are suited for engaging with the nacelle through the lifting areas 14 at the periphery 26 of the nacelle 3, making the first lifting means 15 engage with the load carrying structure 10 of the nacelle 3.

In another embodiment the transverse boom 29 connecting the two first lifting means 15 at the back 19 of the nacelle 3 could in itself form the engaging member 22 of the first lifting means 15 or the lifting means 15 could in themselves form engaging members 22.

At the underside 21 if the nacelle 3 a base device 20 can be connected to the annular member 27 of the nacelle 3. The base device 20 enables that the nacelle 3 can be placed on the ground 17 without it turning over and without it needing further support.

The two second lifting means 16 at the underside 21 of the nacelle 3 acts on the nacelle 3 by being engaged with the base device 20 by means of engaging members 22 extending from a transverse boom 29 connecting the two second lifting means 16 into the front end 31 of the base device 20, hereby enabling that the second lifting means 16 acts on the nacelle 3 at the longitudinal centre axis 25 of the nacelle 3 i.e. on the annular member 27 of the yaw arrangement at the underside of the nacelle 3.

In another embodiment the one or more second lifting means 16 or one or more transverse booms 29 connecting more than one second lifting means 16 could act directly on the annular member 27, on the load carrying structure 10 of the nacelle 3, on dedicated lifting areas 14 or other as long as it enables that the second lifting means 16 acts on the nacelle 3 at or near the longitudinal centre axis 25 of the nacelle 3 to ensure a good stability and load distribution during the lift.

A handling system 11 according to the invention can e.g. be used for self-loading and unloading of the nacelle 3 from a vehicle. A nacelle 3 placed on the ground 17 or on some kind of temporary storage frame could be provided with lifting means 15, 16 by placing the engaging members 22 of a number of lifting means 15, 16 so that they engage with the lifting areas 14 of the nacelle 3 or in another way make the lifting means 15, 16 act on the nacelle 3. The lifting means 15, 16 are then activated e.g. by pumping hydraulic oil into hydraulic cylinders of the lifting means 15, 16 hereby pushing pistons 23 of the lifting means 15 out and increasing the vertical extend of the lifting means 15, 16 whereby the nacelle 3 is lifted substantially vertically.

While the lifting means 15 maintains the nacelle 3 in a stationary elevated position, a transport vehicle can be placed underneath the nacelle 3 or the nacelle 3 can then be attached to a truck in one end and a trailer in the other end, after which the lifting means 15 are retracted again so that they can be easily moved into a transport position.

Figures 8, 9, 10:
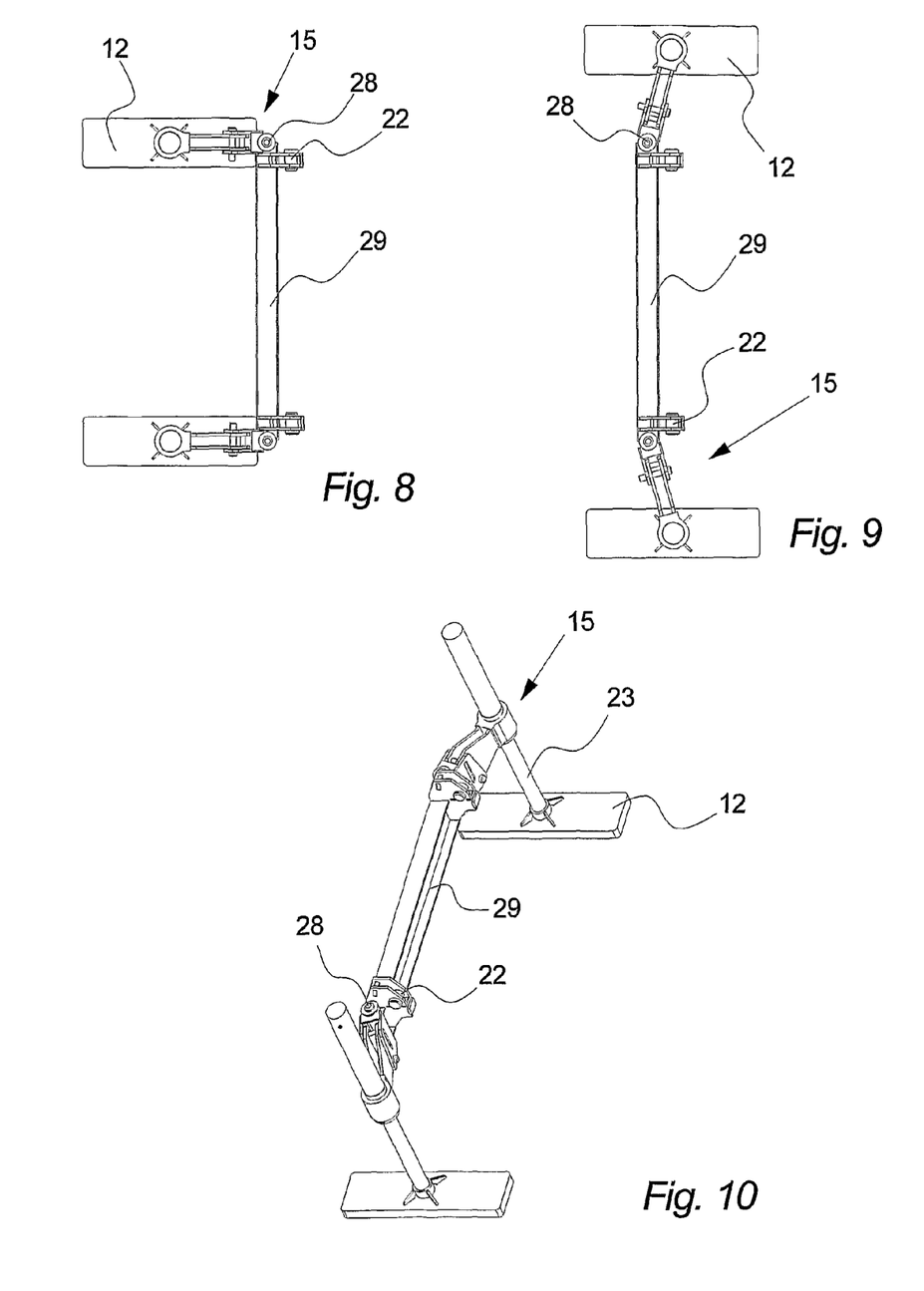
FIG. 8 illustrates an embodiment of first lifting means in transport position, as seen from the top.
FIG. 9 illustrates an embodiment of first lifting means in loading position, as seen from the top.
FIG. 10 illustrates an embodiment of first lifting means in transport position, as seen in perspective.

FIG. 8 illustrates an embodiment of first lifting means 15 in transport position, as seen from the top.

In this embodiment the displacing means 28 of the lifting means 15 substantially only permit motion in a horizontal plane in that the hinges 28 enables rotation around a substantially vertical axis but in another embodiment the rotation axis of the displacing means 28 could be orientated differently or each displacing mean 28 could comprise several hinges to form a multi-joint for performing a more complex motion between the different positions of the lifting means 15, 16 or the displacing means 28 could comprise guides for performing a more or less linear motion e.g. by enabling that the lifting means 15, 16 could be moved linearly between a transport position and the present loading position e.g. by means of hydraulic cylinders.

FIG. 9 illustrates an embodiment of first lifting means 15 in loading position, as seen from the top.

In this embodiment the displacing means 28 enables that the lifting means 15 can be rotated freely approximately 180° but in another embodiment the lifting means 15 or the displacing means 28 could be provided with mechanical stops, limiting the motion of the displacing means 28. These mechanical stops could e.g. be adjustable and cushioned.

FIG. 10 illustrates an embodiment of first lifting means 15 in transport position, as seen in perspective.

In this embodiment the displacing means 28 allow substantially free motion of the lifting means 15 at all times but in a preferred embodiment of the invention the displacing means 28 would be provided with means for locking or fixating the lifting means 15 in specific positions e.g. to ensure that the lifting means stays in the transport position during the entire transport.

Figure 11:
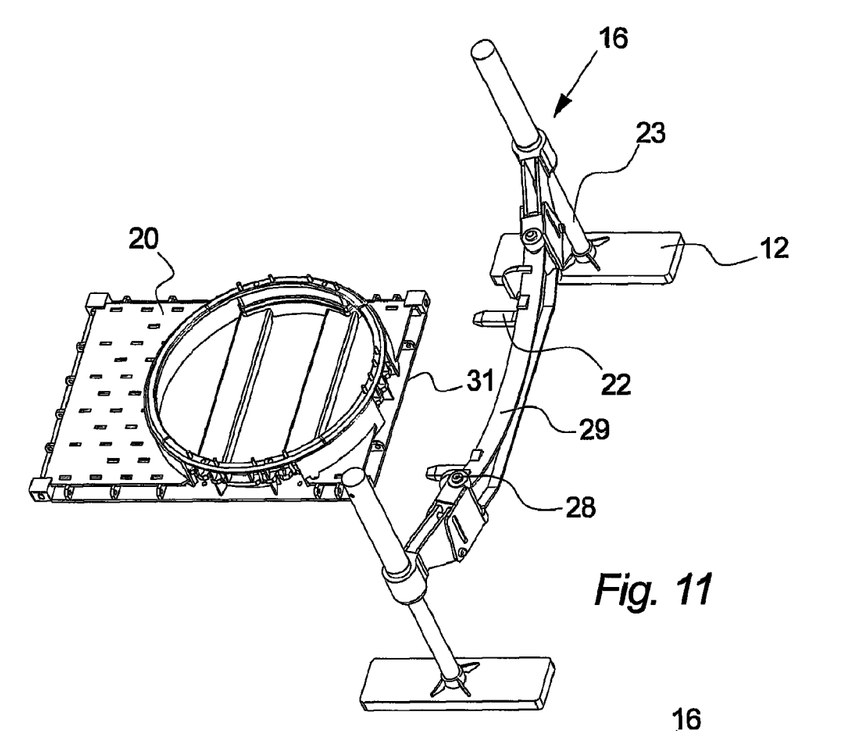
FIG. 11 illustrates an embodiment of second lifting means in loading position, as seen in perspective.

FIG. 11 illustrates an embodiment of second lifting means 16 in loading position, as seen in perspective.

In this embodiment of the invention the engaging members 22 are formed as rectangular pins extending from the lifting means 16 to engage with corresponding holes in the front end 31 of the base device 20. By forming the engaging members 22 as rectangular pins with a relatively close fit with the corresponding hole in the base device 20 it is ensured that the lifting means 16 can not rotate when engaged, hereby ensuring that the nacelle do not overturn when lifted by the lifting means 15. In this embodiment the engaging members 22 are further connected by the transverse boom 29 which also will aid in increasing the stability of the handling system 11.

In this embodiment of the invention the lifting means 15, 16 are formed as hydraulic cylinders but in another embodiment the lifting means could be formed as screw jacks, some sort of jaw tongs mechanism, another type of linear actuators such as a motor or manually driven spindle and spindle nut system, pneumatic actuators or other.

Figure 12:
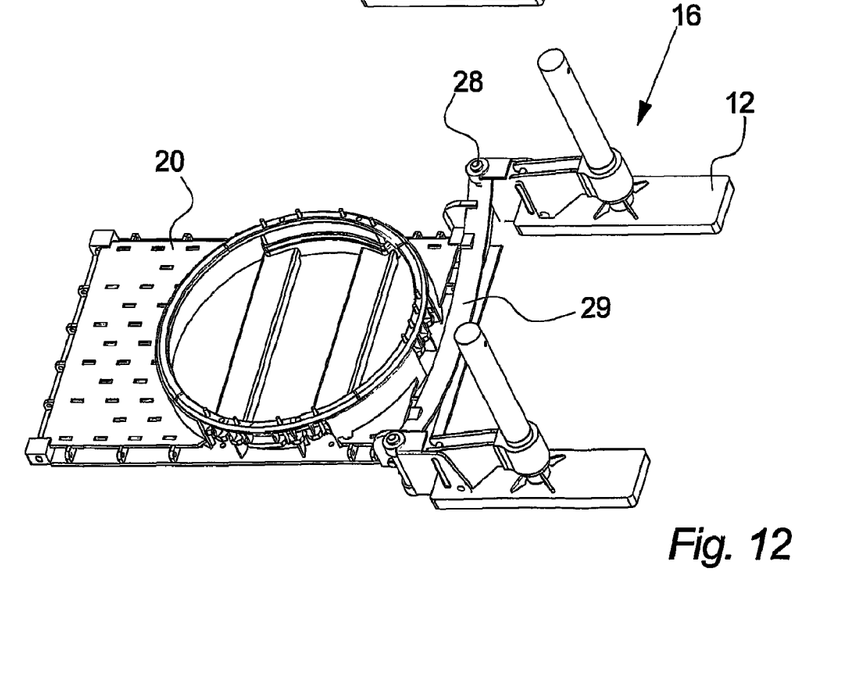
FIG. 12 illustrates an embodiment of second lifting means in transport position, as seen in perspective.

FIG. 12 illustrates an embodiment of second lifting means 16 in transport position, as seen in perspective.

The present design of the engaging members 22 provides the lifting means 16 with means for transferring torque to the annular member 27 of the nacelle 3 in the longitudinal direction of said nacelle and to a much less degree in the transverse direction of the nacelle 3. However the present design of the engaging members 22 of the first lifting means 15 provides the lifting means 15 with means for transferring torque to lifting areas 14 of the nacelle 3 in the transverse direction of said nacelle and to a much less degree in the longitudinal direction. This combination provides for a very steady, stable and inexpensive handling system 11. However it is obvious for the skilled person that a number of different means and methods for making the lifting means 15, 16 engage with or at least act on the nacelle are feasible such as bolting or other.

Figure 13:
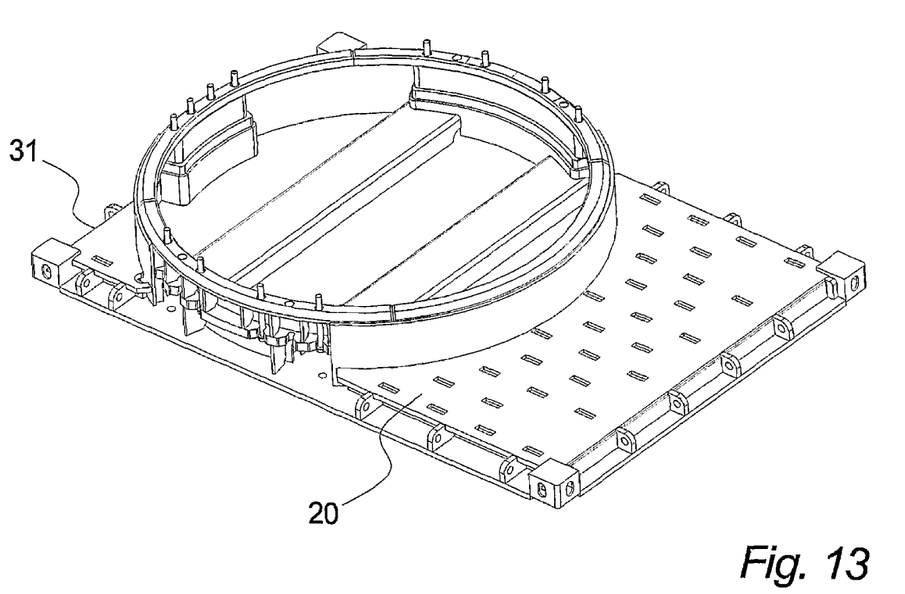
FIG. 13 illustrates an embodiment of a base device, as seen in perspective.

FIG. 13 illustrates an embodiment of a base device 20, as seen in perspective.

In this embodiment the base device 20 comprises means for being bolted to the annular member 27 of the nacelle 3 in that this member 27 already is designed to cope with great loads, however it is also feasible that the base device 20 could be connected to the nacelle directly via the nacelles load carrying structure 10.

Figure 14:
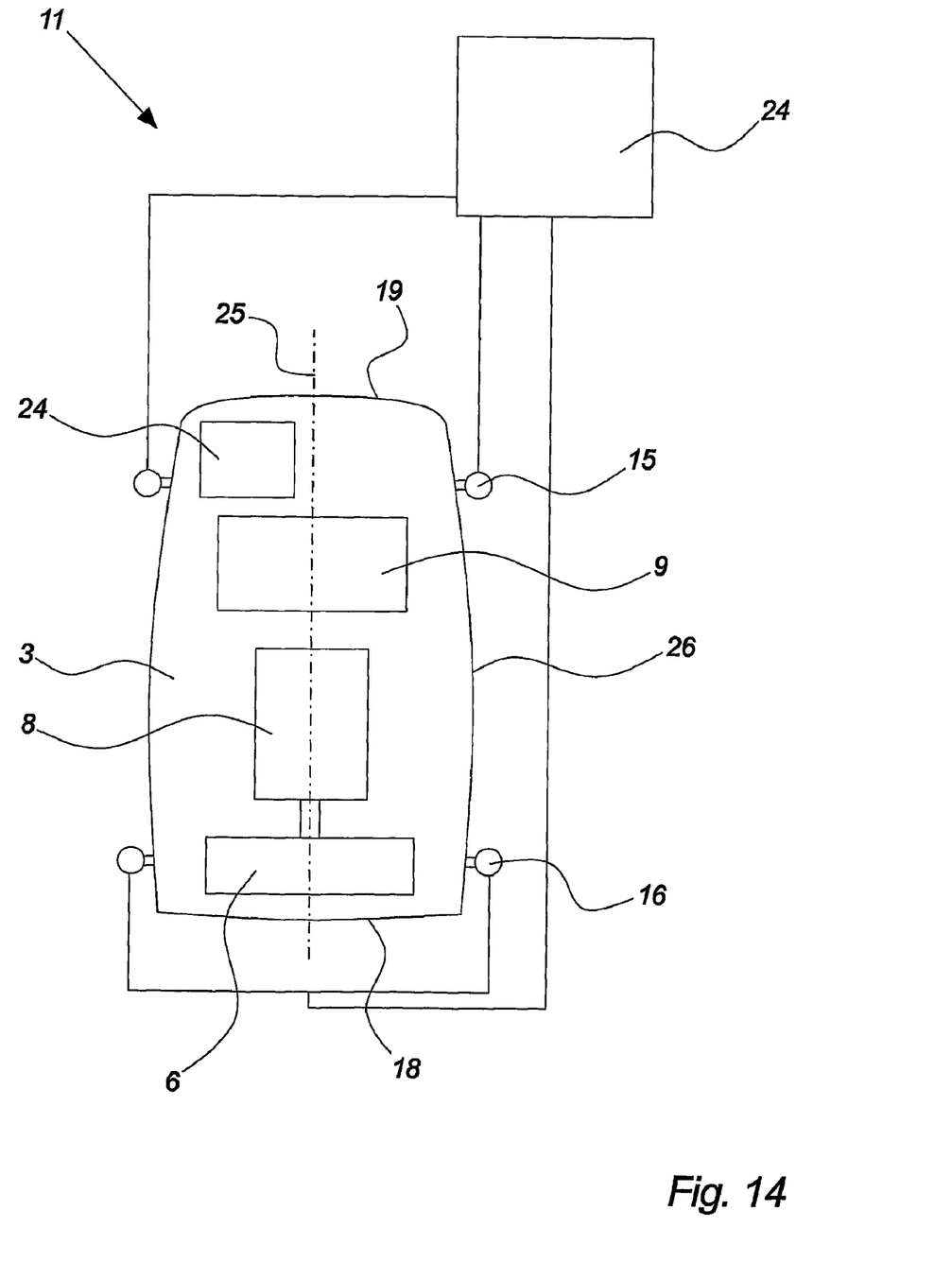
FIG. 14 illustrates a handling system comprising lifting means connected to a common oil pump, as seen from the top.

FIG. 14 illustrates a handling system 11 comprising lifting means 15, 16 connected to a common oil pump 24, as seen from above.

In this embodiment of the invention the oil pump 24 comprises three individually adjustable valves but in another embodiment the oil pump 24 could comprise only one valve, two valves, four valve or another number of valves.

In this embodiment of the invention four symmetrically positioned lifting means 15, 16 in the form of hydraulic cylinders are positioned in a loading position outside the width W of the nacelle 3. The first lifting means 15 placed on either sides of the nacelle 3 at the rear 19 of the nacelle 3 are each individually connected to an oil pump making it possible to adjust the vertical extend of the two cylinders independent from each other and all other cylinders.

The second lifting means 16 at the front end 18 of the nacelle 3 are connected to the same output of the oil pump 24 making these two cylinders 16 extend equally when pressurized. Hereby the handling system 11 comprises three individually adjustable lifting systems which can provide for a stable handling system with a reduced risk of wobbling.

In another embodiment of the invention the lifting means 15, 16 could be connected to the oil pump 24 in another configuration such as connecting all the cylinders 15, 16 individually, connecting all the cylinders to the same output of the oil pump making all the cylinders 15 extend uniformly when activated, providing each lifting mean 15, 16 with its own oil pump 24, providing the first lifting means 15 with their own oil pump 24 and the second lifting means 16 with their own oil pump 24 or other.

In this embodiment of the invention the oil pump 24 is an independent unit placed outside the nacelle 3 but the nacelle 3 is often provided with its own oil pump 24 so in another embodiment the lifting means 15, 16 could be connected to the nacelle oil pump or they could be connected to an oil pump of a truck or another vehicle transporting the nacelle 3.

The invention has been exemplified above with reference to specific examples of handling systems 11, nacelles 3, lifting means 15, 16 and other. However, it should be understood that the invention is not limited to the particular examples described above but may be designed and altered in a multitude of varieties within the scope of the invention as specified in the claims.

LIST

1. Wind turbine
2. Tower
3. Nacelle
4. Rotor
5. Blade
6. Gearbox
7. Brake system
8. Generator
9. Inverter
10. Load carrying structure
11. Handling system
12. Support member
13. Latticework
14. Lifting area
15. First lifting means
16. Second lifting means
17. Underlying ground
18. Front side of nacelle
19. Backside of nacelle
20. Base device
21. Underside of nacelle
22. Engaging member
23. Piston
24. Oil pump
25. Longitudinal centre axis of nacelle
26. Outer periphery of nacelle
27. Annular member
28. Displacing means
29. Transverse boom
30. Gear bell
31. Front end of base device
W. Width of nacelle
LH. Lifting height
NA. Normal operation angle

The invention claimed is:

1. A wind turbine nacelle handling system in connection with self-loading or self-unloading of a nacelle, the handling system comprising:
    a wind turbine nacelle with a load carrying structure configured for carrying the weight of said nacelle and the nacelle components mounted in said nacelle; and
    two or more lifting devices for displacing said nacelle substantially vertically during said self-loading or self-unloading of said nacelle;
    wherein at least one of said lifting devices is detachably engaged with lifting areas integrated in a bottom structure of said load carrying structure of said nacelle, said lifting areas being a part of said load carrying structure or being rigidly connected to said load carrying structure, and
    wherein at least one of said lifting devices further comprises displacing devices enabling displacement at least in a horizontal plane of said lifting devices or a part of said lifting devices.

2. The handling system according to claim 1, wherein at least one first lifting device of said two or more lifting devices comprises a device for being engaged with said nacelle at or near the outer periphery of said nacelle.

3. The handling system according to claim 2, wherein said at least one first lifting device comprises a device for lifting by applying linear force to said load carrying structure of the nacelle.

4. The handling system according to claim 1, wherein at least one second lifting device of said two or more lifting devices is engaged with a base device connected to an annular member at the bottom of said nacelle.

5. The handling system according to claim 4, wherein said annular member is a part of a yaw arrangement for said nacelle.

6. The handling system according to claim 1, wherein said displacing devices comprise one or more hinges enabling said displacement.

7. The handling system according to claim 1, wherein said lifting areas are established in relation to the weight distribution of said nacelle providing substantially uniform load on each of said lifting devices when self-loading or self-unloading.

8. The handling system according to claim 1, further comprising at least two individually adjustable lifting devices.

9. The handling system according to claim 1, wherein at least one of said two or more lifting devices comprises a device for being substantially rigidly connected to at least one further of said two or more lifting devices.

10. The handling system according to claim 1, wherein said at least two lifting devices are connected rigidly by a transverse boom.

11. The handling system according to claim 10, wherein said transverse boom comprises engaging members for connecting said lifting devices directly or indirectly to said nacelle.

12. The handling system according to claim 10, wherein said two or more lifting devices comprise one or more hydraulic cylinders each.

13. Use of a handling system according to claim 1, wherein said nacelle is a nacelle for a Megawatt wind turbine.

14. A method for transport of a wind turbine nacelle comprising a load carrying structure configured for carrying the weight of the nacelle and nacelle components mounted in the nacelle, the method comprising:
- engaging two or more lifting devices with lifting areas integrated in a bottom structure of the load carrying structure of the nacelle;
- lifting the nacelle by the lifting devices;
- positioning a vehicle for transporting the nacelle underneath the nacelle;
- retracting the lifting devices to place the nacelle on the vehicle; and
- displacing one or more of the lifting devices at least in a horizontal plane while remaining engaged to the lifting areas.

15. The method according to claim 14, wherein the displacing of the lifting devices at least in a horizontal plane reduces the overall width of the lifting devices and the nacelle in combination.

16. The method according to claim 14, wherein the lifting devices comprise hydraulic cylinders vertically displacing the nacelle substantially proportional with the extension or extraction of a piston of the hydraulic cylinders.

17. The method according to claim 14, wherein one or more second lifting devices act on at least a part of a yaw arrangement of the nacelle.

* * * * *